3,174,847
METHOD OF MELTING AND REFINING
Barney Dagan, Ontario, Calif., assignor to Kaiser Steel Corporation, Oakland, Calif., a corporation of California
No Drawing. Filed Feb. 8, 1960, Ser. No. 7,137
6 Claims. (Cl. 75—43)

This invention relates to the making of steel. More particularly, the invention relates to improvements in producing steel in a converter involving the melting of solid ferrous metal by blowing with oxygen by means of a tube or lance.

Under present day converter practices, molten ferrous metal to be refined is charged into a converter, with or without solid scrap additions, and blown to steel.

In accordance with this invention it is now possible to start with a solid ferrous metal charge in a converter to produce steel.

The invention comprises providing a solid charge of ferrous metal, for example, a mixture of pig iron and steel scrap, in a converter and adding carbonaceous material on top of the metal charge. The carbonaceous material is ignited and a stream of oxygen of predetermined pressure is discharged vertically downwardly and centrally of the converter into contact with the ignited carbonaceous material to maintain combustion thereof in order to generate sufficient heat to initiate melting and oxidation refining of the solid metal charge. Thereafter, the pressure of the oxygen stream is increased to complete melting of the solid charge and production of steel of desired composition. According to conventional practices, slag-forming materials such as lime and fluorspar can be charged into the converter.

Although a number of suitable carbonaceous materials are available, it is presently preferred to use coke. Generally the amount of carbonaceous material added to the converter will be in the range of from about 0.5 to 1.75 percent by weight of the solid ferrous charge. In any given operation, the specific amount of carbonaceous material used will be governed by such factors as heat value of the material and temperature and chemical composition of the solid charge.

The ignition of the carbonaceous material can be accomplished in various ways. It is presently preferred to have the converter tilted with its longitudinal axis approaching horizontal and project a flame in through the converter mouth upon the carbonaceous material and to continue so doing until combustion of the material is well underway. Thereafter the converter can be moved up to operating position for receiving of the oxygen stream.

The initial oxygen stream discharged into the converter, after ignition of the carbonaceous material, will be at a given lance pressure and flow rate during the first portion of the oxygen blowing operation, that is, during combustion of the carbonaceous material to the point where sufficient heat has been generated to initiate melting, and oxidation refining, of the solid metal charge. This is demonstrated by the propagation of a visible flame. At such time the oxygen pressure and flow rate will be increased for the balance of the blowing operation.

In order to more fully understand the invention, the following example is given.

A converter was provided with a solid charge of ferrous metal, the total weight being 225,240 pounds. This charge comprised pig iron in the amount of 178,000 pounds and crop and rotary steel scrap in total amount of 47,240 pounds. The chemical composition of the pig iron was about 3.50% carbon, 1.00% manganese, 0.035% sulfur, 0.200% phosphorus, 1.00% silicon, balance iron. The chemical composition of the crop and rotary steel scrap averaged about 0.25% carbon, 0.45% manganese, 0.035% sulfur, 0.010% phosphorus, 0.08% silicon, balance iron. On top of the solid ferrous metal charge was added about 2,400 pounds of coke (about 1% by weight of metal charge) which generally was of nut size. The converter was tilted toward the horizontal and a coke oven gas flame directed against the coke for purposes of igniting same. The gas flame was continued until it was apparent combustion of the coke was well underway. Thereafter, the flame was withdrawn and the converter moved back to operational position.

Lime was added to the converter in the amount of 1,000 pounds and by means of a lance a stream of oxygen was discharged vertically downwardly and centrally of the converter into contact with the charged materials. The oxygen was blown through a lance the tip of which was positioned about 6 feet above the charged materials. The lance pressure was 60 pounds per square inch and the rate of flow of oxygen was 3,410 cubic feet per minute. The oxygen stream was continued for about 10 minutes during which combustion of the coke was maintained and sufficient heat generated to initiate melting and oxidation refining of the metal charge as was demonstrated by the propagation of a visible flame from the converter mouth. Thereafter the lance pressure was increased to 75 pound per square inch and the rate of flow of oxygen being 4,160 cubic feet per minute. This was continued for a period of 42 minutes during which the entire metal charge was melted and oxidation refining proceeded. At the end of this period the oxygen supply was turned off for a period of about 7 minutes for purposes of determining temperature and composition of the molten metal. The temperature was measured at 2,845° F.

During the above 42 minute period, a total of 14,000 pounds of lime and 1,200 ponnds of fluorspar were intermittently added to the converter. In addition, after 11 minutes of said 42 minute period 500 pounds each of ferrosilicon (75% Si) and ferromanganese (80% Mn) were added to the converter. Also, after 40 minutes of said period the lance was lowered such that the tip of the lance was positioned about 5 feet above the molten metal.

At the end of the 7 minute period of interruption in oxygen flow, the oxygen was again turned on for a period of 9 minutes to complete the refining operation, the lance pressure being 75 pounds per square inch, the rate of flow being 4,160 cubic feet per minute and the tip of the lance being about 5 feet above the molten metal. During the early portion of this time, 2,000 pounds of lime were added to the converter.

Upon completion of oxygen blowing, the slag was removed and the molten metal, which was measured at a temperature of 2,970° F., was poured into ladles and then into ingot molds. While in ladles 1,200 pounds of ferromanganese, 200 pounds of ferrophosphorous, 600 pounds of burned lime, 19 pounds of aluminum and 50 pounds of recarburizing material were added. 9 pounds of aluminum and 10 pounds of sodium fluoride were added to the ingot molds. The final steel weight was 194,400 pounds and final composition was 0.08% carbon, 0.34% manganese, 0.021% phosphorus, 0.022% sulfur and 0.16% copper.

It will be understood that the present invention is not limited to the specific materials, steps, and other specific details described above and may be carried out with various modifications without departing from the scope of the invention as defined in the appended claims.

What is claimed is:
1. A method of making steel comprising the steps of providing a solid charge of ferrous metal in a converter, adding carbonaceous material on top of said solid charge, igniting said carbonaceous material, discharging a stream of oxygen at a first pressure vertically downwardly and centrally of the converter into contact with the ignited carbonaceous material to maintain combustion thereof, sufficient heat being produced thereby to initiate melting and oxidation refining of said ferrous charge, increasing the pressure of said stream of oxygen and continuing to discharge said oxygen stream at increased pressure to complete melting of the solid charge and produce steel of desired composition.

2. A method of making steel according to claim 1 wherein the carbonaceous material is added in amount of from about 0.5 to 1.75% by weight of the solid charge of ferrous metal.

3. A method of making steel according to claim 1 wherein the carbonaceous material is coke.

4. A method of making steel according to claim 1 wherein the solid charge of ferrous metal is a mixture of pig iron and scrap.

5. A method of making steel according to claim 1 wherein the solid charge of ferrous metal is a mixture of pig iron and scrap and the carbonaceous material is coke in an amount of about 0.5% to 1.75% by weight of the solid metal charge.

6. A method of making steel comprising the steps of providing a solid charge of ferrous metal in a converter, said charge being a mixture of pig iron and scrap with the major portion thereof being pig iron, adding coke on top of said charge, igniting said coke, said coke being present in amount of about 1% by weight of the solid metal charge, discharging a stream of oxygen at a pressure of about 60 pounds per square inch and flow rate of about 3,410 cubic feet per minute vertically downwardly and centrally of the converter into contact with the ignited carbonaceous material to maintain combustion thereof, sufficient heat being produced thereby to initiate melting and oxidation refining of said ferrous charge, increasing the pressure of said stream of oxygen to about 75 pounds per square inch with a flow rate of about 4,160 cubic feet per minute and continuing to discharge such oxygen stream at increased pressure and flow rate to complete melting of the solid charge and produce steel of desired composition.

References Cited in the file of this patent

UNITED STATES PATENTS

| | | |
|---|---|---|
| 51,401 | Bessemer | Dec. 5, 1865 |
| 2,741,555 | Cuscoleca et al. | Apr. 10, 1956 |

OTHER REFERENCES

"Oxygen Enriched Cupola Blast," Iron Age, March 31, 1949, page 69.

"Oxygen in Steelmaking?," Steel, June 23, 1947, pages 106–108, page 144.